(12) United States Patent
Li et al.

(10) Patent No.: US 10,700,612 B2
(45) Date of Patent: Jun. 30, 2020

(54) CONTROL METHOD FOR COMBINATION POWER SUPPLY OF BOOST AND BRIDGE TYPE DC-DC

(71) Applicant: SHANGHAI TUITUO Technology Co., Ltd., Shanghai (CN)

(72) Inventors: Renhong Li, Shanghai (CN); Zhuo Shen, Shanghai (CN)

(73) Assignee: SHANGHAI TUITUO TECHNOLOGY CO. LTD., Shanghai (CN)

( * ) Notice: Subject to any disclaimer, the term of this patent is extended or adjusted under 35 U.S.C. 154(b) by 0 days.

(21) Appl. No.: 16/391,462

(22) Filed: Apr. 23, 2019

(65) Prior Publication Data

US 2019/0326824 A1 Oct. 24, 2019

(30) Foreign Application Priority Data

Apr. 24, 2018 (CN) .......................... 2018 1 0370621

(51) Int. Cl.
*H02M 3/335* (2006.01)
*H02M 1/08* (2006.01)
*H02M 1/00* (2006.01)

(52) U.S. Cl.
CPC ....... *H02M 3/33569* (2013.01); *H02M 1/083* (2013.01); *H02M 2001/0009* (2013.01); *H02M 2001/0058* (2013.01)

(58) Field of Classification Search
CPC ....... H02M 3/156–158; H02M 3/1584; H02M 3/1588; H02M 3/33507; H02M 3/3523; H02M 3/33569; H02M 1/083; H02M 2001/0009; H02M 2001/0058
USPC ........................................................... 363/17
See application file for complete search history.

(56) References Cited

U.S. PATENT DOCUMENTS

| 4,533,986 | A | * | 8/1985 | Jones .................. | H02M 1/4208 323/222 |
| 2006/0152204 | A1 | * | 7/2006 | Maksimovic ........... | H02M 1/38 323/284 |
| 2010/0165668 | A1 | * | 7/2010 | Lin ........................ | H02M 1/10 363/21.02 |
| 2011/0038190 | A1 | * | 2/2011 | Zimpfer .................. | A61B 6/56 363/126 |

(Continued)

*Primary Examiner* — Yemane Mehari
(74) *Attorney, Agent, or Firm* — Amster, Rothstein & Ebenstein LLP

(57) ABSTRACT

A PFWM control method for a combination power supply of the boost converter and the bridge type DC-DC converter which also includes BUCK. A method of using the PFWM to control both boost and DC-DC converters simultaneously. A monitor module senses the bridge type DC-DC converter's output voltage, current or power, to obtain the frequency of PFM for driving switching components; predetermined a duty by design and use a frequency to adjust the boost output so as to adjust the DC-DC output voltage, current or power. Another monitor module senses the input instant voltage and the boost output voltage to obtain a maximum duty which is used to prevent the boost inductor from saturation. Combine above frequency and duty into at least a pair of complement PFWM driving signals, to directly or indirectly drive the combination power supply of boost converter and bridge type DC-DC converter's switching components.

7 Claims, 17 Drawing Sheets

(56) References Cited

U.S. PATENT DOCUMENTS

| | | | | |
|---|---|---|---|---|
| 2012/0262953 | A1* | 10/2012 | Jungreis | H02M 3/337 363/17 |
| 2013/0235631 | A1* | 9/2013 | Pahlevaninezhad | H02M 1/42 363/126 |
| 2014/0211515 | A1* | 7/2014 | Tomioka | H02M 3/158 363/21.02 |
| 2014/0246908 | A1* | 9/2014 | Chew | H02M 3/156 307/24 |
| 2014/0268908 | A1* | 9/2014 | Zhou | H02M 7/5381 363/21.03 |
| 2015/0117062 | A1* | 4/2015 | Jin | H02M 1/4241 363/17 |
| 2018/0219474 | A1* | 8/2018 | Greetham | H02M 1/4208 |
| 2018/0227995 | A1* | 8/2018 | Ekbote | H05B 33/0815 |

\* cited by examiner

CONTROL METHOD FOR COMBINATION POWER SUPPLY OF BOOST AND BRIDGE TYPE DC-DC

CROSS-REFERENCE TO RELATED APPLICATION

The present application claims the benefit of and priority to Chinese Patent Application No. 201810370621.7, filed on Apr. 24, 2018, the entire contents of which are incorporated by reference herein.

FIELD

Embodiments of the present disclosure generally relate to a PFWM control method, and more particularly to a power supply combination of the boost converter and the bridge type (including the half bridge, the full bridge and BUCK) DC-DC converter. A PFWM (Pulse Frequency and Width Modulation) signal, containing a frequency modulation and a pulse width modulation simultaneously, controls and drivers boost converter, to achieve the power factor correction function of the AC power supply, in the meantime it controls and drives the DC-DC converter

BACKGROUND

Electrical equipment or appliance connected to the AC power grid line should satisfy the current harmonic standard IEC61000-3-2. For different equipment or application, IEC61000-3-2 defines their corresponding current harmonic limits. Class A is for normal electrical equipment, Class C is for lighting equipment and class D is for portable personal computer, monitor and TV.

Current switching mode power supply technology, in order to realize the power factor correction function, mainly utilizes the active PFC method which adopts boost topology (FIG. 1 and FIG. 2).

Such boost converter integrates with a DC-DC converter and has an excellent power factor correction performance. Due to independent circuits of boost and DC-DC converters, individual power switching components, feedback control and driving units are used resulting in high cost, big size and low efficiency.

In order to overcome above shortcomings, a combination circuit of boost and bridge converters is presented in FIG. 3. This circuit, by sharing switching component of bridge type converter, drives boost inductor, saves boost switching component and boost rectifier in conventional boost PFC circuit, saves individual PWM PFC control unit, as the result, cost reduced, space saved and efficiency improved.

However, above combination power supply (FIG. 3), sharing common switching components, makes it impossible to control the boost converter and the DC-DC converter together by the conventional feedback control and the driving unit 300. Disadvantages are listed as following:

Disadvantage 1: The boost output voltage is not under control.

By using the feedback and the driving controller 300, the first switching component Q2 and the second switching component Q3 are driven by the PWM complement signal, so that the DC-DC output can be close-loop stabilized by adjusting the duty of PWM signal as convention. However, due to the same PWM signal to drive the boost circuit via the first switching component Q2, the boost circuit output has no feedback control and it swings according to the DC-DC's PWM and the input AC instant voltage. The bridge type DC-DC converter's maximum duty is always smaller than 50%, therefore, the boost converter's duty is also limited to less than 50%. Instead of conventional almost up to 100% operation in the boost converter, that 50% duty at the input AC low instant voltage makes the boost converter insufficient to convert the power, so that the boost output voltage on the storage capacitor C2 would be possible lower than the input AC peak voltage. Charging the current through the rectification circuit D1 might occur at the peak AC instant voltage as shown in FIG. 5A and FIG. 5B which makes the AC input current distorted at the low input voltage and heavy load.

Disadvantage 2: When the boost inductor L1 operates at the high AC input voltage, due to the low reset voltage Vdc−Vin (Vdc: boost output voltage on the storage capacitor C2), the unlimited duty decided by the DC-DC converter would cause the boost inductor insufficient magnetic reset, therefore Vdc has to be designed high enough to ensure resetting.

Vdc is the voltage on the storage capacitor C2 and it is the output voltage of the boost circuit as well. Vin is the voltage on the boost capacitor C1, which reflects the instant voltage of the AC input in real time. Duty means the duty cycle of the DC-DC converter. The magnetic reset equation of the boost inductor L1 is:

$$Vin \cdot Duty = (Vdc - Vin) \cdot (1 - Duty)$$

So Duty(Max)=(Vdc−Vin)/Vdc can be derived. When Vin at its sinusoidal peak, due to instant Vin close to Vdc, Duty(max) has to be very small to ensure the voltage-second balance to realize the magnetic reset. Once the DC-DC converter's duty is more than the Duty(max), the boost inductor L1 saturated and the second switching component Q2 damaged.

Disadvantage 3: When the boost inductor L1 operates at a continuous current mode, the first switching component Q2 works in a hard switching mode and the loss increased.

When the boost inductor L1 operates at a continuous current mode, the first switching component Q2 works in hard switching mode as that in convention boost converter. During the cut-off interval of Q2, there are no resonant current discharges its parasitic capacitor, so ZVS does not occur at its turning on.

Disadvantage 4: When the boost inductor L1 operates at discontinuous current mode, the boost inductor L1, the boost capacitor C1, the second switching component Q3 and the storage capacitor C2 construct a resonant tank by which results in an uncontrolled resonant loop loss.

When the boost inductor L1 operates at a discontinuous current mode, the boost inductor L1, the boost capacitor C1, the second switching component Q3 and the storage capacitor C2 construct a resonant circuit. After the boost current down to zero ampere, and at the state of the first switching component Q2 turning off and the second switching component Q3 turning on, the voltage on the storage C2 charges the resonant tank of the boost inductor L1 and the boost capacitor C1 through the second switching component Q3, to form the resonant current which cause loop loss if it is not under control.

For purpose of solving above problems, a PFWM (Pulse Frequency Width Modulation) method is disclosed to replace the conventional PWM control method.

SUMMARY

The present disclosure provides a PFWM control method which contains a frequency modulation and a pulse width modulation suitable for above combination power supply of the boost and the bridge type DC-DC converter.

To achieve the above objective, the present disclosure provides a type of PFWM control method for a combination power supply of the boost converter and the bridge type DC-DC converter which also includes BUCK. The control method, comprising:

S1: Sensing the DC-DC converter's output voltage, current or power, to obtain a frequency of the PFM chopping signal for driving switching components according to the automatic feedback and control theory;

S2: Sensing the instant input voltage and the boost output voltage, to obtain a maximum duty to prevent the boost inductor from saturation caused by an insufficient magnetic reset;

S3: Predetermining an operating duty which is limited by the obtained maximum duty;

S4: Combining the obtained frequency of the PFM and the operating duty into at least a pair of complement PFWM driving signals, directly, indirectly or after modification to drive at least the first switching component and the second switching component of the bridge type DC-DC converter, adjusting the boost converter output so as to control the DC-DC output.

The PFWM control method for the combination power supply of the boost converter and the bridge type DC-DC converter further includes a dead time control between complement PFWM driving signals, to drive switching components of the boost converter and the bridge type DC-DC converter.

The PFWM control method for the combination power supply of the boost converter and the bridge type DC-DC converter contains a zero current detection of the boost inductor, upon which controls the elapse interval between the boost inductor's current returning to zero and next on-to-off operation of the second switching component.

The PFWM control method for the combination power supply of the boost converter and the bridge type DC-DC converter further senses the instant input voltage, and sets a maximum frequency of the PFWM according to its value or range.

The PFWM control method for the combination power supply of the boost converter and the bridge type DC-DC converter further senses the instant input voltage, and sets a minimum frequency of the PFWM according to its value or range.

The PFWM control method for the combination power supply of the boost converter and the bridge type DC-DC converter contains several pairs of PFWM signals, driving several said combination power supplies.

The PFWM control method for the combination power supply of the boost converter and bridge type DC-DC converter contains several pairs of PFWM channels, driving several channels of said combination power supplies in the manner of interleaving, phase shift or synchronization.

To summarize based on above, the present disclosure provides a PFWM control method which contains a frequency modulation and a pulse width modulation suitable for above combination power supply of boost and bridge type DC-DC converters. The PFWM control method gives a DC-DC output feedback and then controls the boost converter's output by adjusting the frequency at the predetermined duty, so as to indirectly control the DC-DC converter's output; Limit the predetermined duty dynamically with the Duty(max) to ensure fully magnetic reset of the boost inductor. The invention improves the boost converter's operation which is restrained by the DC-DC PWM control in the conventional method as described before. In addition, relying on the maximum frequency, the minimum frequency and the dead time control, the combination power supply of boost and bridge type converters could achieve the resonant ZVS operation, as the result, both efficiency and EMI performance can be improved.

DETAILED DESCRIPTION OF EMBODIMENTS

Hereinafter, the preferred embodiments will be described in further detail with reference to FIGS. 1~18 to show the technical content, structural feature and achieved goal and effect of the present disclosure.

Figure 1:
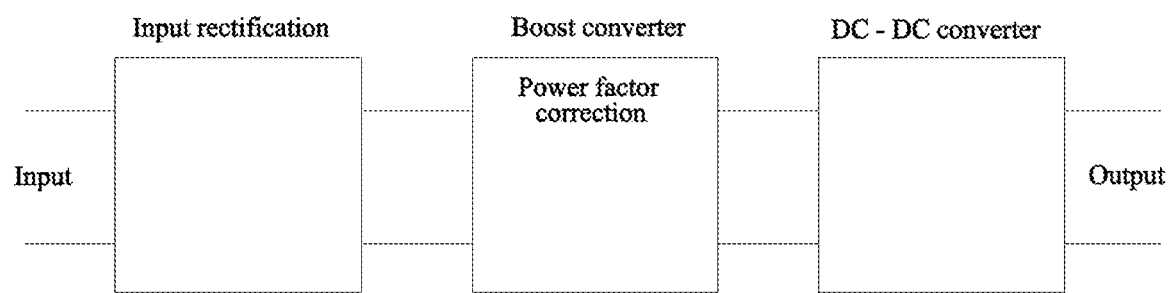
FIG. 1 is a block diagram of the conventional power supply combination of the boost and the bridge type DC-DC converter.
Figure 2:
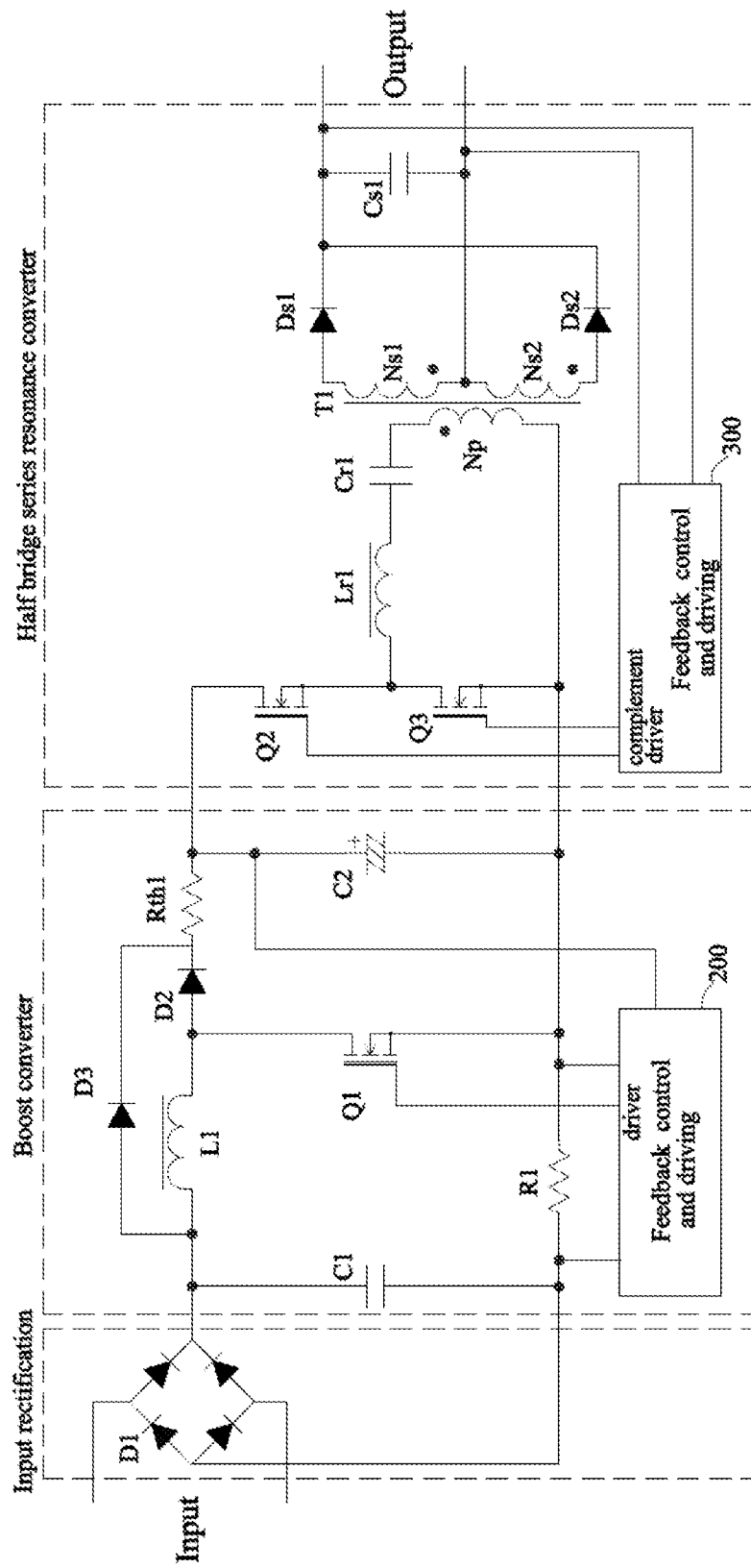
FIG. 2 is a schematics diagram of the conventional boost and the bridge type DC-DC converter.
Figure 3:
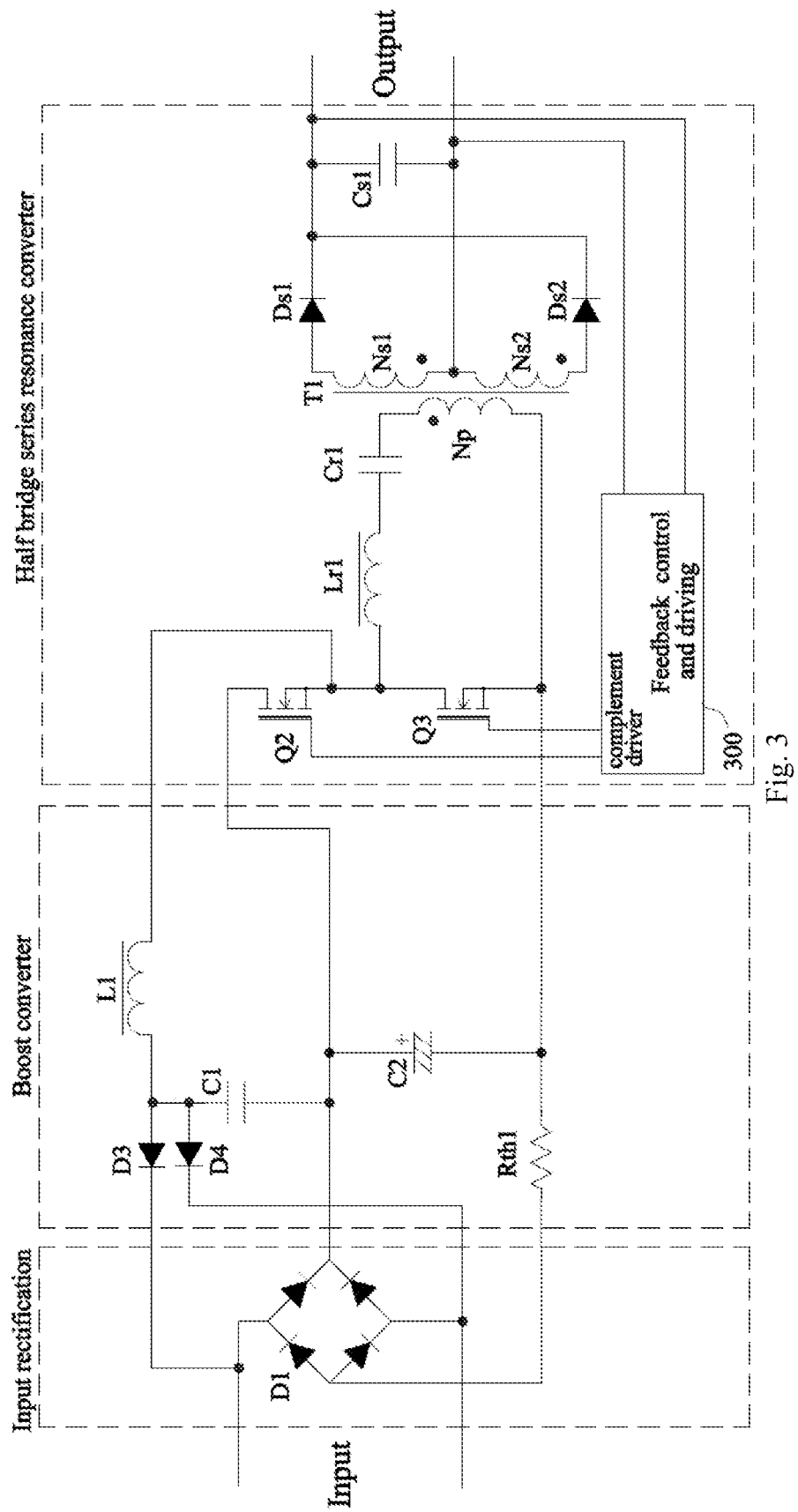
FIG. 3 is a schematics diagram of the conventional combination power supply of the boost and the bridge type DC-DC converter.
Figure 4:
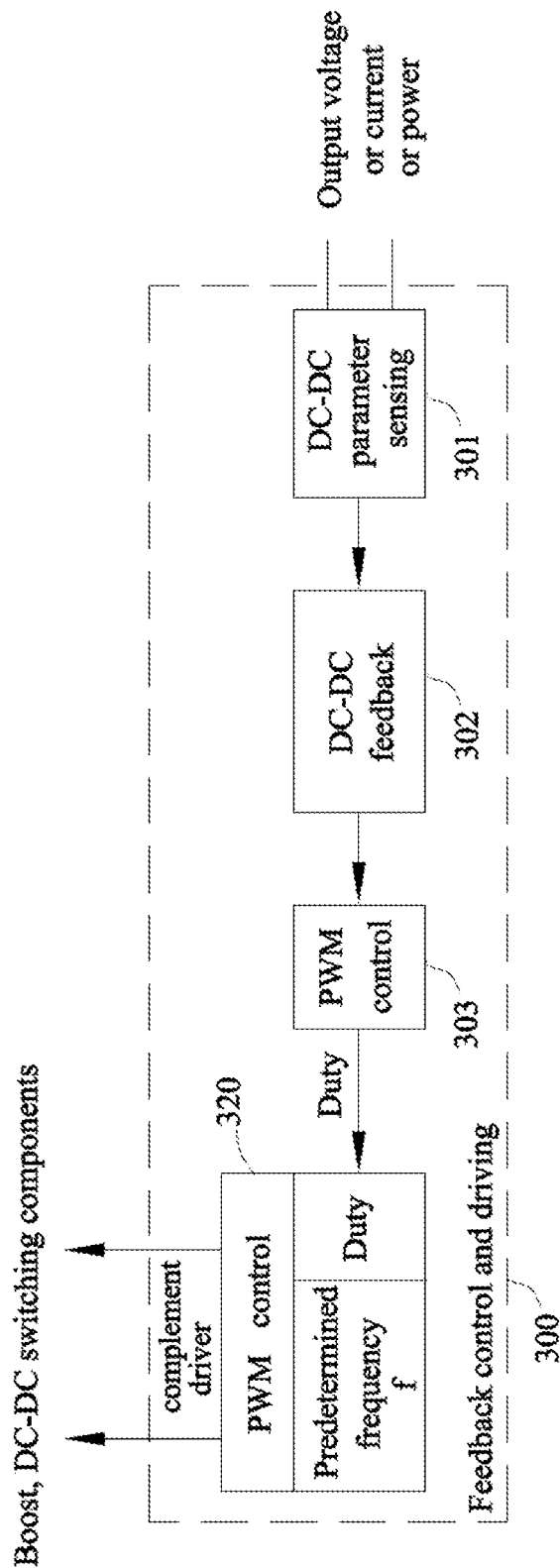
FIG. 4 is a schematics diagram of the conventional PWM feedback control and the driving unit.
Figure 5A:
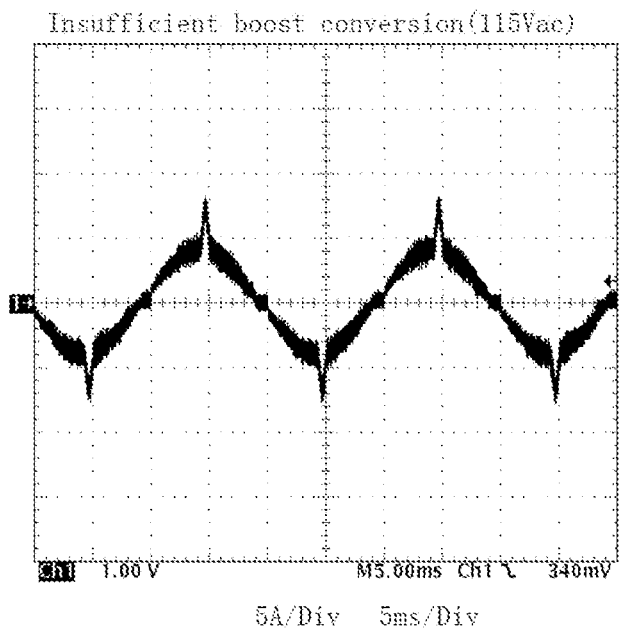
FIG. 5A and FIG. 5B are input current waveforms by the conventional PWM feedback control and the driving unit.
Figure 5B:
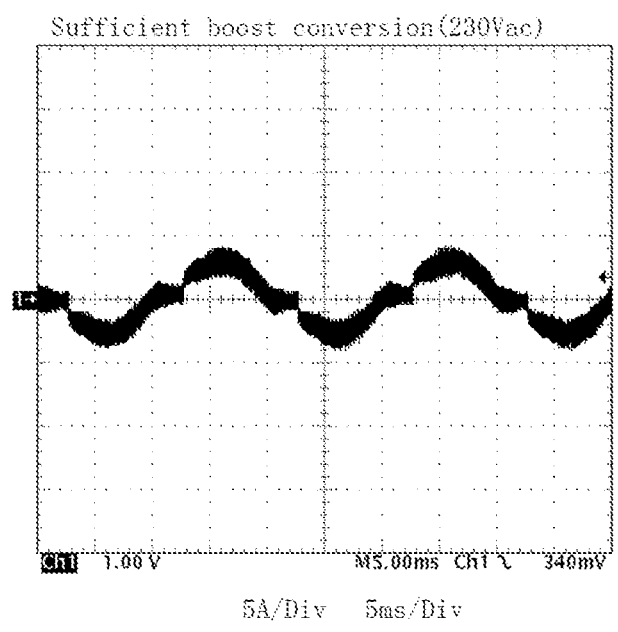
Figure 6:
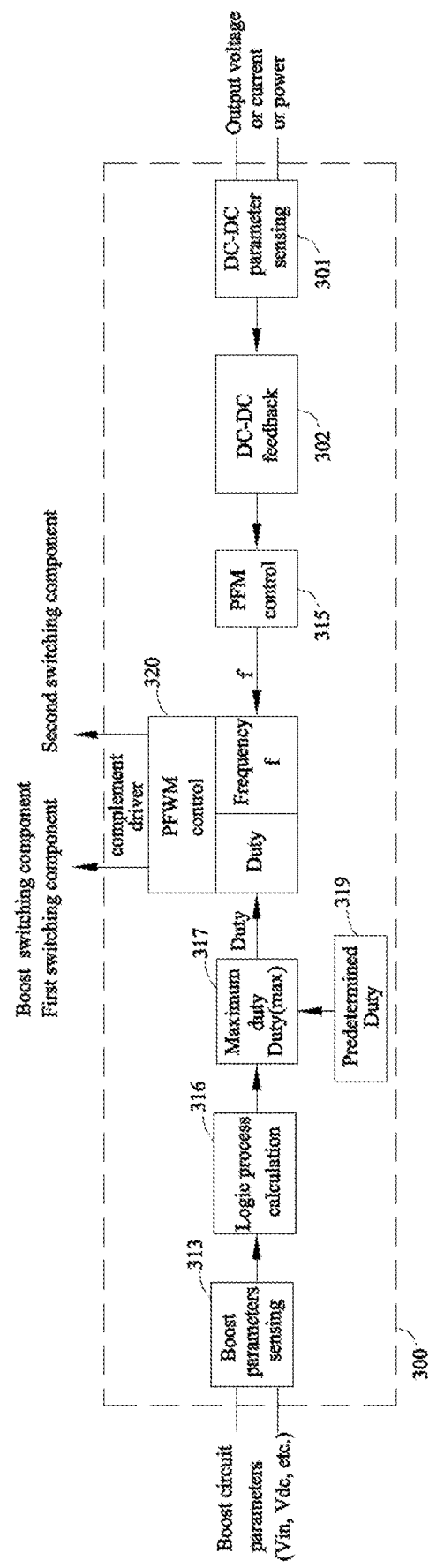
FIG. 6 is a schematics diagram of the PFWM feedback control and the driving unit according to the present disclosure.
Figure 7:
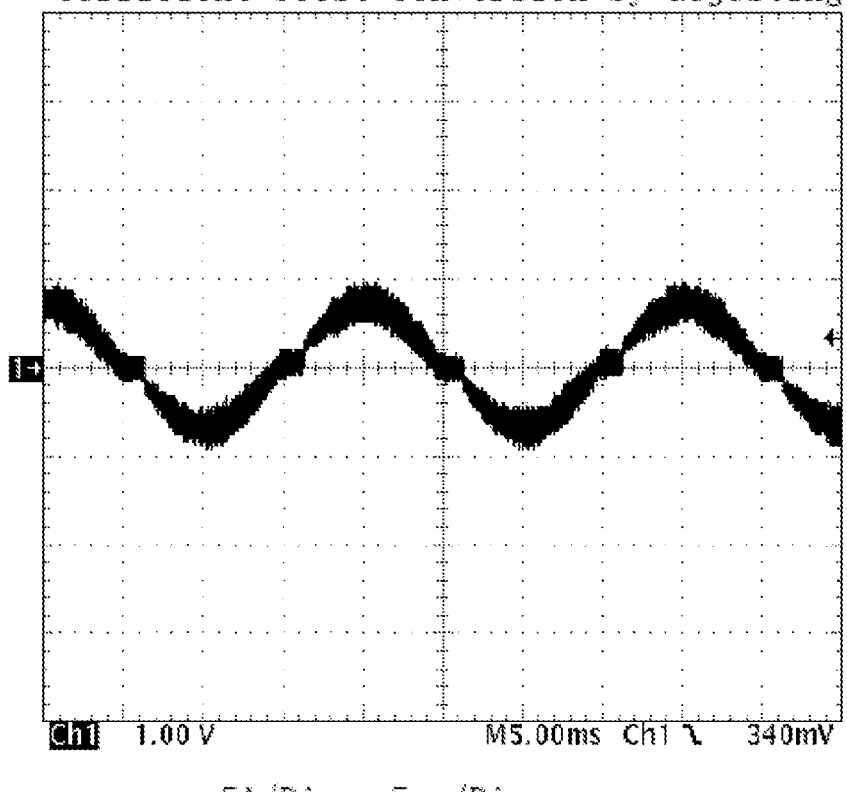
FIG. 7 is an input current waveform improvement on FIG. 5B by the frequency adjustment.

An example of the combination power supply of boost and half bridge DC-DC converters is shown in FIG. 3, and the PFWM type feedback control and the driving unit 300 worked with FIG. 3's circuit is shown in FIG. 6 according to the present disclosure. The power supply system's control process comprises the following steps:

S1: Sensing the DC-DC converter's output voltage, current or power, to obtain a frequency of the PFM chopping signal for driving switching components according to the automatic feedback and control theory;

S2: Sensing the instant input voltage and the boost output voltage, to obtain a maximum duty to prevent the boost inductor from saturation caused by an insufficient magnetic reset;

S3: Predetermining an operating duty which is limited by the obtained maximum duty;

S4: Combining the obtained frequency of the PFM and the operating duty into at least a pair of complement PFWM driving signals, directly, or indirectly, or after modification to drive at least the first switching component and the second switching component of the bridge type DC-DC converter, adjusting the boost converter output so as to control the DC-DC output.

The present disclosure of PFWM control method is able to control both the DC-DC converter and the boost converter simultaneously. By sensing the said DC-DC converter output parameter, comparing it to the setting value and according to the automatic control theory to obtain the frequency of the PFM chopping signal to drive the boost converter. Due to the PFM operating at the predetermined duty, the DC-DC converter operates at almost the fixed voltage transfer ratio and the PFM signal actually indirectly controls the DC-DC output by adjusting the frequency. DC-DC output parameter includes but not constraint to the output voltage or current or power; Automatic control theory could be conventional PID or zero-pole method, or any others more.

The DC-DC converter's output voltage Vout is the function of its operating duty: Vout=f (Duty). Details refer to below:

For a half bridge DC-DC converter: Vout=Vdc·Ns/Np·Duty;

For an asymmetrical half bridge DC-DC converter, the power conversion equation is: Vout=Vdc·Duty·(1−Duty)·(Ns1/Np+Ns2/Np)

For a BUCK DC-DC converter: Vout=Vdc·Duty

For a full bridge DC-DC converter: Vout=2·Vdc·Duty·Ns/Np

In above equation, Vdc represents the voltage on the storage capacitor C2; Ns/Np represents primary to secondary turns ratio of the main transformer. According to equations above, the DC-DC converter's output could be adjusted by the Duty. Once the duty has been predetermined, the DC-DC transfer ratio is fixed.

For the boost converter, the output power Pout is the function of its operating frequency and duty: Pout=f (f, duty):

$$Pout=Vin \cdot Vdc \cdot Duty \cdot (1-Duty)/(2 \times f \times L)$$

Pout is the boost circuit average output power; Vin is the instant AC voltage after rectification; L is the inductance of boost inductor like L1.

According to this equation, the boost converter output voltage could be adjusted by the frequency while the Duty has been predetermined.

Therefore, the PFWM driving signal can be made by the combination of the predetermined duty and the frequency f calculated by giving a feedback and controlling of the DC-DC converter. Such PFWM is able to control the boost output so that the DC-DC output is indirectly controlled.

Furthermore, the control method of the present disclosure is to ensure the boost inductor L1 magnetic reset during the input voltage alternating change. The magnetic reset equation of the boost inductor is Vin·Duty=(Vdc−Vin)·(1−Duty), so Duty(Max)=(Vdc−Vin)/Vdc can be derived. The feedback control unit monitor inputs the instant input voltage and limits the operating duty with the Duty(max). When Vin is less than Vdc/2, the boost inductor always can reset because the first switching component Q2 operates below 50% duty in the half bridge converter. When Vin is more than Vdc/2, due to the Duty(max) limit, the boost inductor can reset under duty control.

Above PFM's predetermined duty is dynamically limited by the Duty(max), so the combination of the frequency and the variable operating duty forms the PFWM signal to drive boost and DC-DC converters' switching components.

When the boost converter operates at a CCM, like the conventional boost converter, the first switching component Q2 operates at a hard switching mode. In the embodiment, to reduce the switching loss and EMI emission, the first switching component Q2 could be designed in a soft switching mode.

Additionally, design to ensure the boost inductor operated at a discontinuous mode. The maximum frequency limitation f(max) 318 is to provide enough reset time for the boost current returning to zero ampere, prevent the boost inductor L1 from entering a continuous current mode (CCM).

From drawings FIG. 8 to FIG. 12, an operating principle of the soft switching (ZVS) is illustrated once the boost inductor is designed in a DCM.

Figure 8:
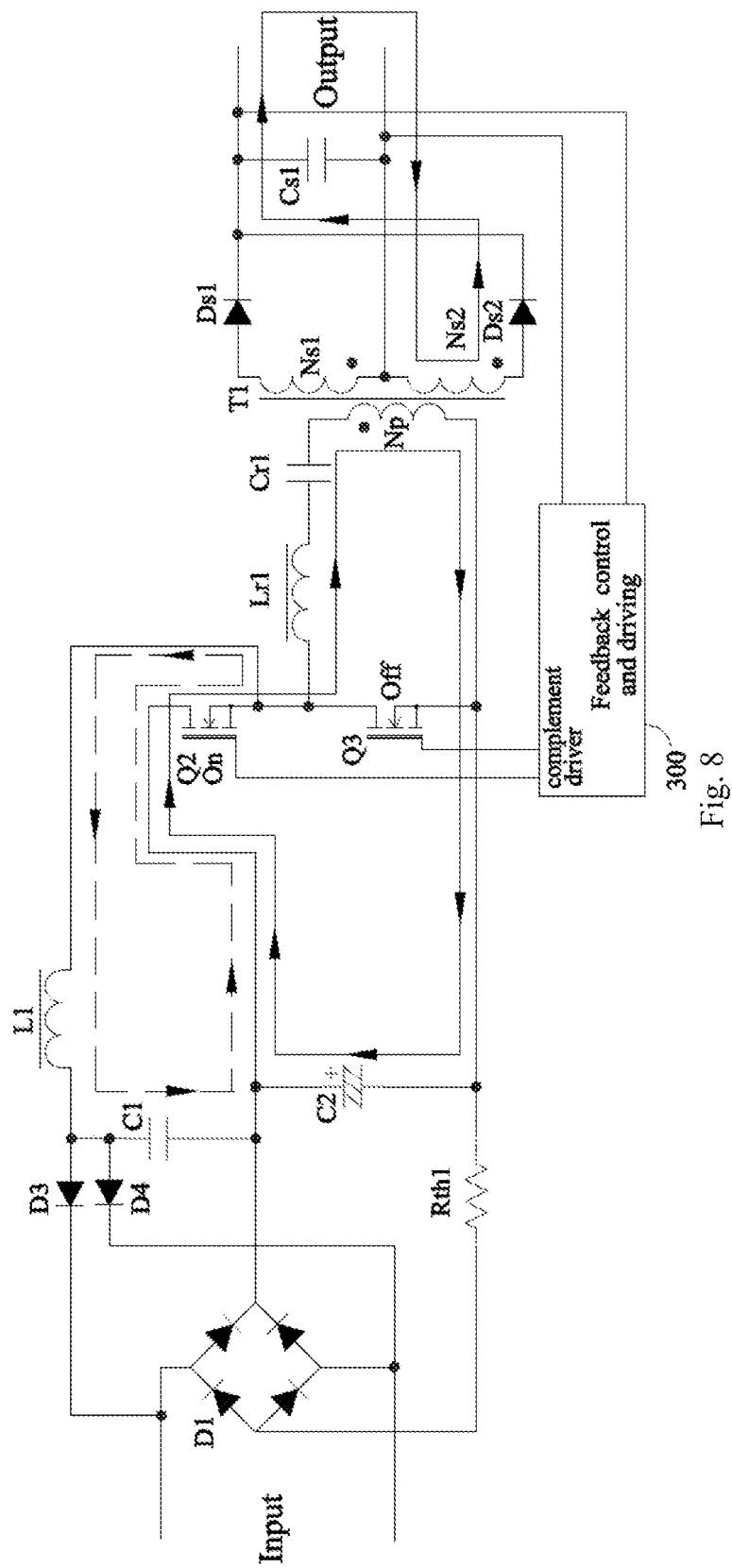
FIG. 8 is the operating state 1 of the combination power supply of the boost and the half bridge according to the present disclosure.

State 1: as shown in FIG. 8, the first switching component Q2 turns on, the second switching component Q3 turns off.

The voltage on the boost capacitor C1 reflects the instant input AC voltage after rectification. The voltage on the storage capacitor C2 is the output of the boost converter Vdc.

When the first switching component Q2 conducts, the energy in the storage capacitor C2 sequentially passes through the resonant inductor Lr1 and the resonant capacitor Cr1 into the primary winding (Np) of the main transformer T1, transfers to the secondary winding Ns2, delivers the power energy to load through the output rectification component Ds2 and the filter Cs1.

Simultaneously, the energy on the boost capacitor C1, reflecting the change of the AC input voltage, flows through the first switching component Q2 into the first boost inductor L1 as indicated by the dotted line with arrow, the boost energy stored in the boost inductor L1.

Figure 9:
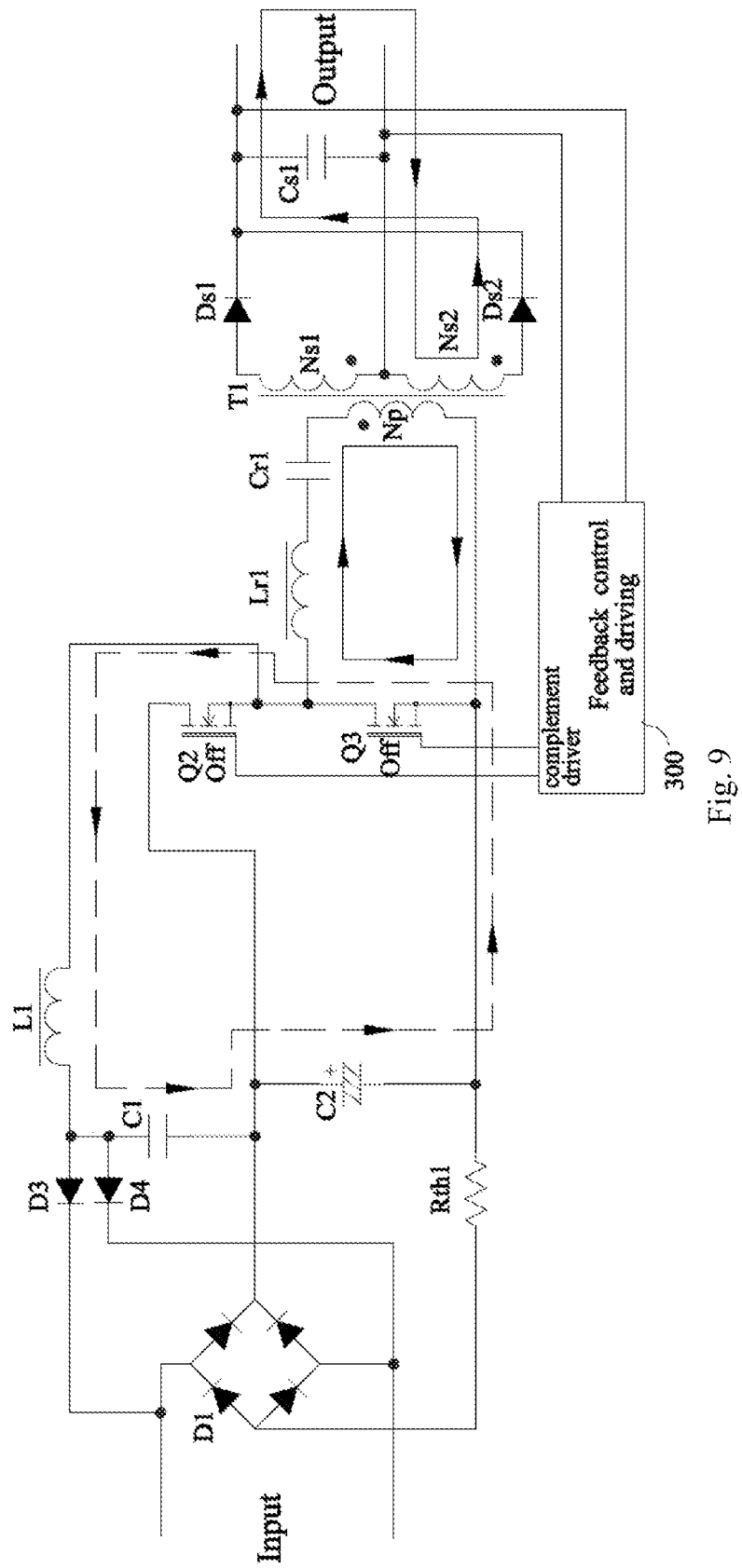
FIG. 9 is the operating state 2 of the combination power supply of the boost and the half bridge according to the present disclosure.

State 2: as shown in FIG. 9, the first switching component Q2 turns off, the second switching component Q3 keeps turn-off. After the first switching component Q2 turns off, the resonant tank constructed by resonant inductor Lr1 and resonant capacitor Cr1 continues to drive the main transformer T1. The resonant capacitor Cr1 is continued to be charged and the energy continues to deliver to the output load.

Simultaneously, the energy stored in the boost inductor L1, right after the first switching component Q2's turn-off, generates the induced voltage. The induced voltage, accumulating with the voltage on the boost capacitor C1, charges the storage capacitor C2 through the second switching component Q3, to accomplish the boost conversion. The parasitic capacitor of the second switching component Q3 is reversely discharged to form zero voltage for ZVS at next state 3-1.

Figure 10:
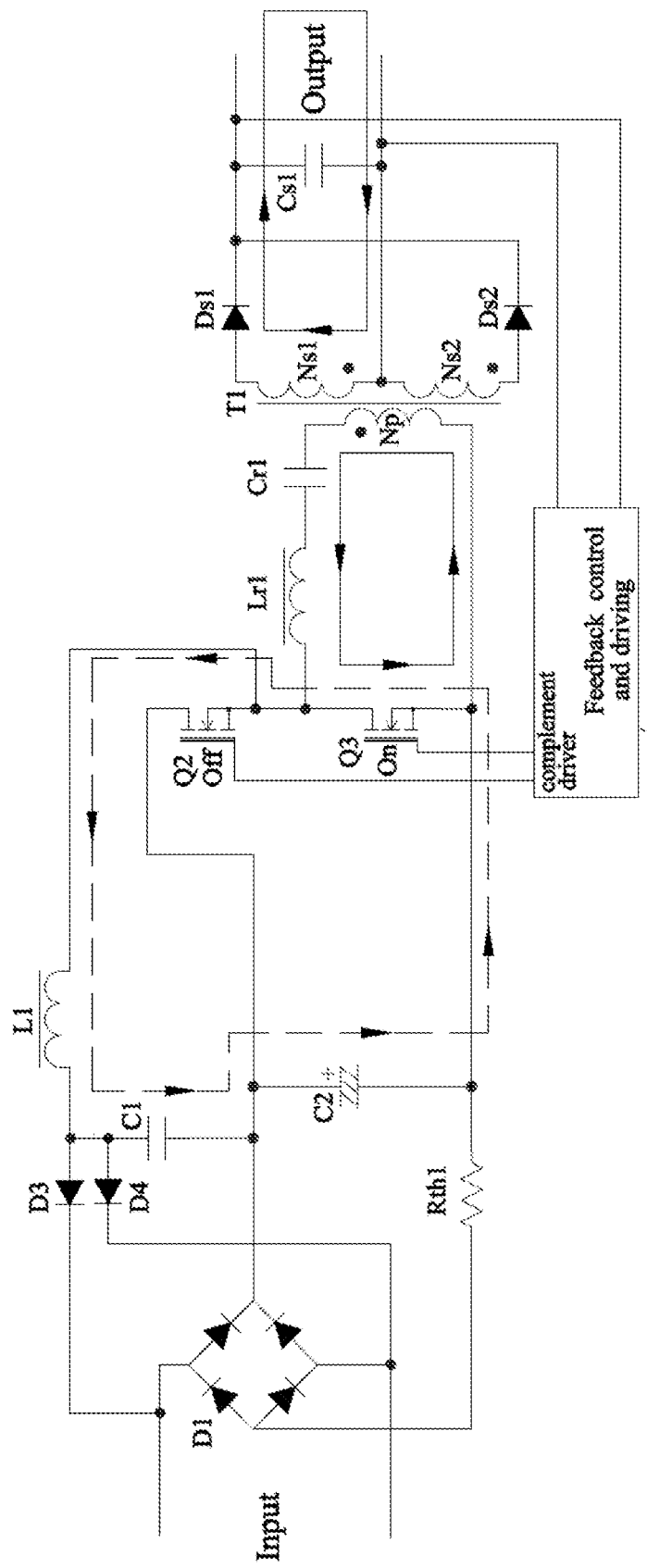
FIG. 10 is the operating state 3-1 of the combination power supply of the boost and the half bridge according to the present disclosure.

State 3-1: as shown in FIG. 10, the first switching component Q2 keeps turn-off, the second switching component Q3 turns on. The boost inductor L1 continues releasing energy, its induced voltage and the voltage on the boost capacitor C1 superimposed to charge the storage capacitor C2 till the boost inductor L1's stored energy fully discharged. The energy in the boost inductor L1 fully discharged to operate as the discontinuous current mode (DCM).

When the second switching component Q3 conducts, the energy on the resonant capacitor Cr1 passes through the resonant inductor Lr1 and the second switching component Q3, flows into the primary winding Np of the transformer T1. This half bridge converter, through the isolated main transformer T1, convert the energy from primary to secondary, further rectified by the rectification component Ds1, filtered by Cr1, to deliver energy to the output load.

Figure 11:
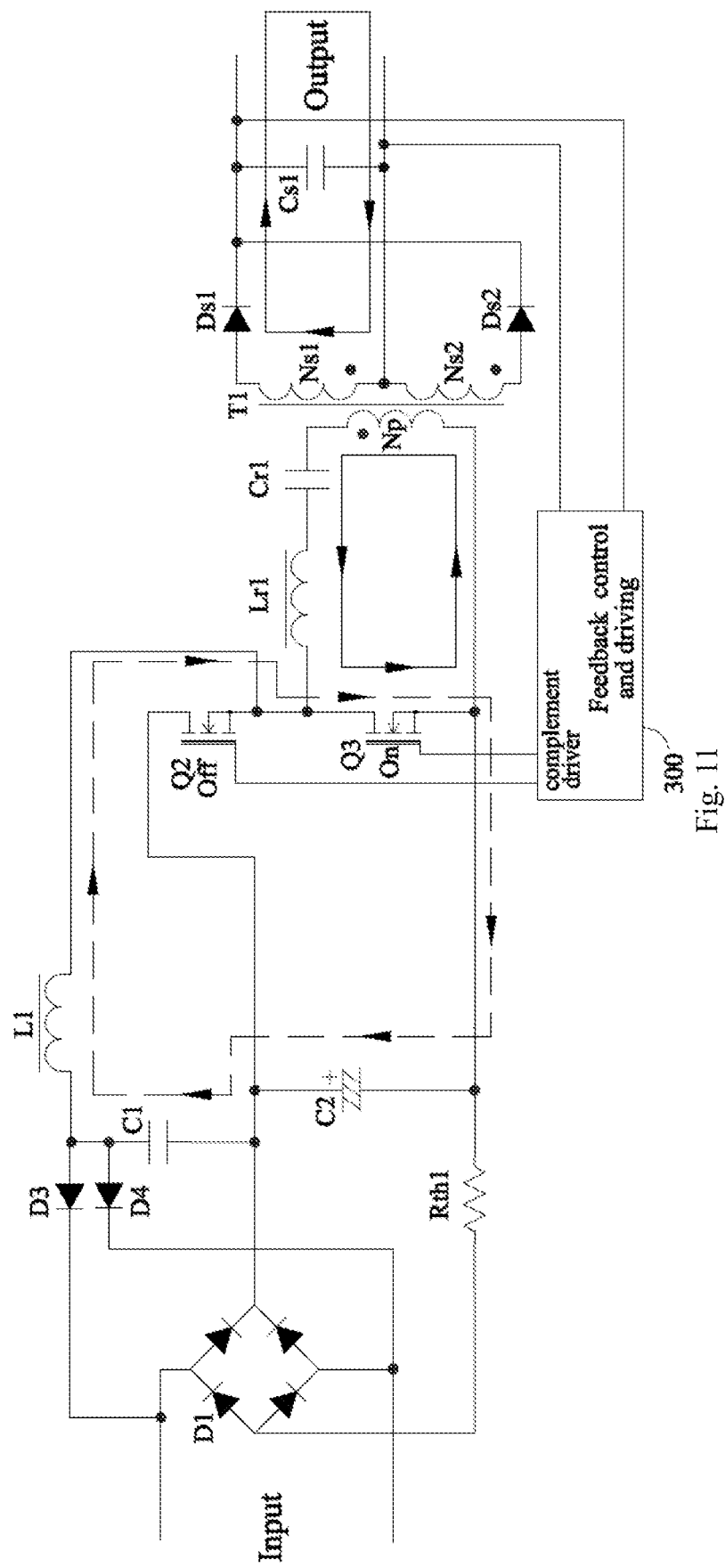
FIG. 11 is the operating state 3-2 of the combination power supply of the boost and the half bridge according to the present disclosure.

State 3-2: as shown in FIG. 11, the first switching component Q2 keeps turn-off, the second switching component Q3 keeps turn-on. After the energy in the boost inductor L1 completely discharged, the energy in the storage capacitor C2, through the second switching component Q3, starts to charge the boost capacitor C1 and the boost inductor L1. The boost capacitor C1 and the boost inductor L1 construct as series resonant tanks.

Lr and Cr1's resonant current continue delivering energy to secondary side load through transformer T1.

Figure 12:
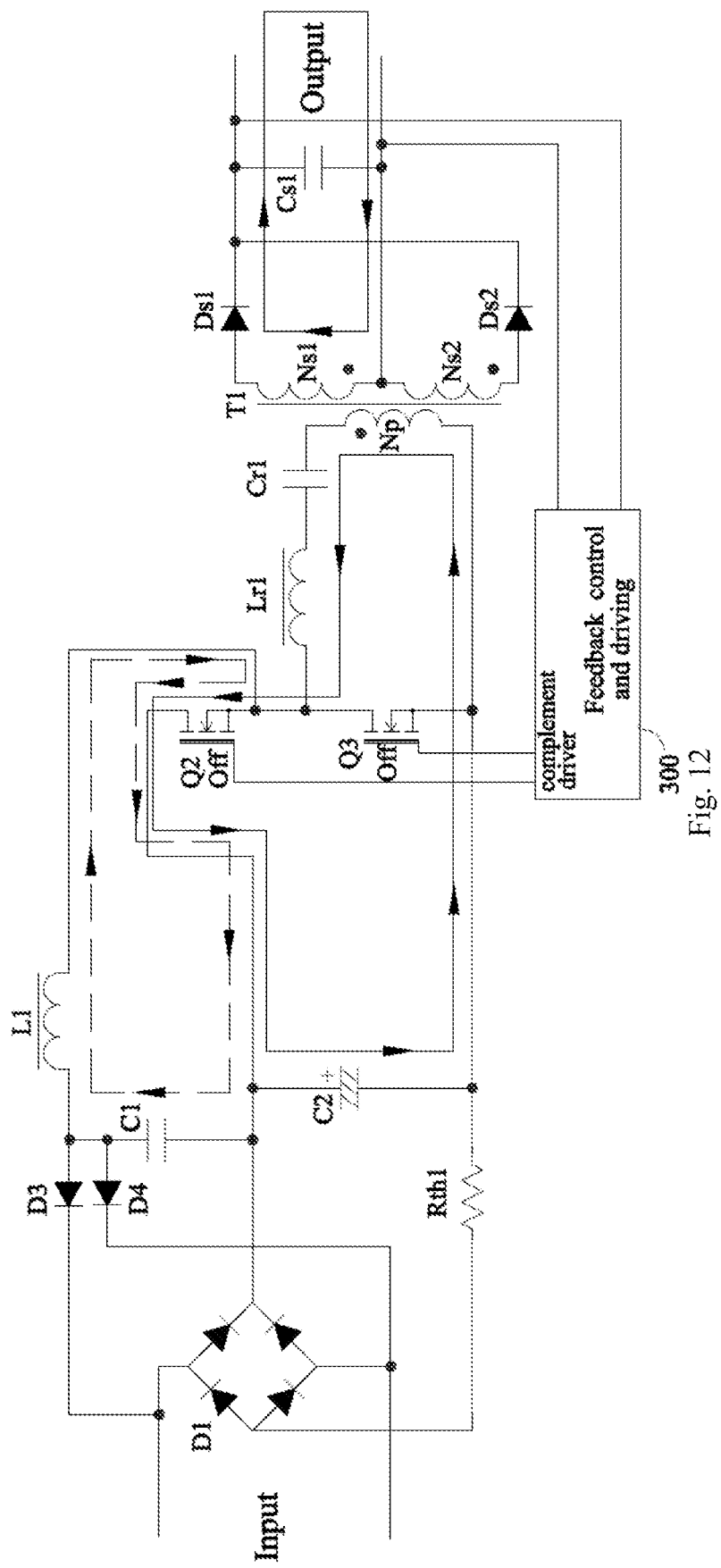
FIG. 12 is the operating state 4 of the combination power supply of the boost and the half bridge according to the present disclosure.

State 4: as shown in FIG. 12, the first switching component Q2 keeps turn-off, the second switching component Q3 turns off.

When the second switching component Q3 turns off, the resonant current in the boost inductor L1, through the body diode of the first switching component Q2, discharges the first switching component Q2's parasitic capacitor, to form the zero voltage for ZVS at next state 1. By controlling the elapse time between the boost inductor current down to zero and the second switching component Q3's turn-off, ZVS performance can be optimized.

The DC-DC resonant bridge operation principle is the same as the conventional asymmetrical half bridge. The first switching component Q2 and the second switching component Q3 disclosed in the present disclosure operate at ZVS state, which result in good efficiency. Furthermore, the ZVS of switching components are achieved by the boost converter not relying on the asymmetrical bridge converter instead, so that the ZVS at the light load condition will be better than the conventional asymmetrical half bridge converter which always has the drawback.

Figure 13:
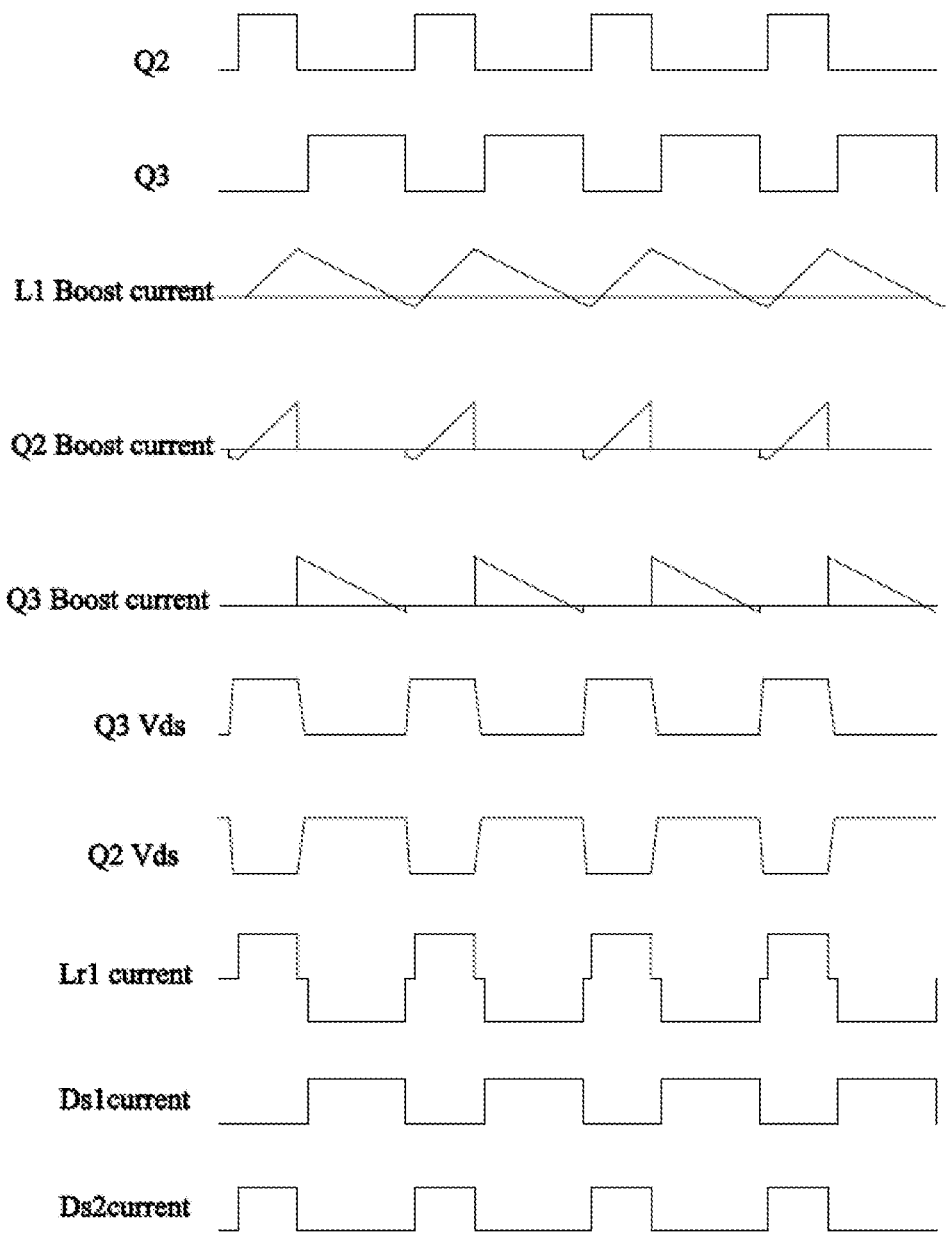
FIG. 13 is the operating waveform of the combination power supply of the boost and the half bridge according to the present disclosure.

Operating waveforms from state 1 to state 4 are shown in FIG. 13.

When the input voltage is more than Vdc/2, setting the maximum frequency f(max) dynamically to ensure an enough time interval allowing the current in the boost inductor L1 to return to the zero ampere to make the boost inductor L1 operated at the DCM. Meanwhile, by designing Vin×Duty<(Vdc−Vin)×0.5 and utilizing the resonance current of the boost inductor L1 and the boost capacitor C1, the sufficient dead time between the turn-on and turn-off of the first switching component Q2 and the second switching component Q3 can be ensured to accomplish the ZVS.

When the input voltage is less than Vdc/2, setting the maximum frequency f(max) to enter the DCM; Also, designing the resonant frequency fr of the boost inductor L1 and the boost capacitor C1 less than the operating frequency f, and further setting the minimum operating frequency f(min), to make sure the resonant current of the boost inductor L1 and the boost capacitor C1 not reverse during the time of the first switching component Q2 turn-off. As the result, during the dead time of the first switching component Q2 and the second switching component Q3, the resonant current discharges the parasitic capacitor of the first switching component Q2 to achieve the ZVS.

Embodiment 1

Figure 14:
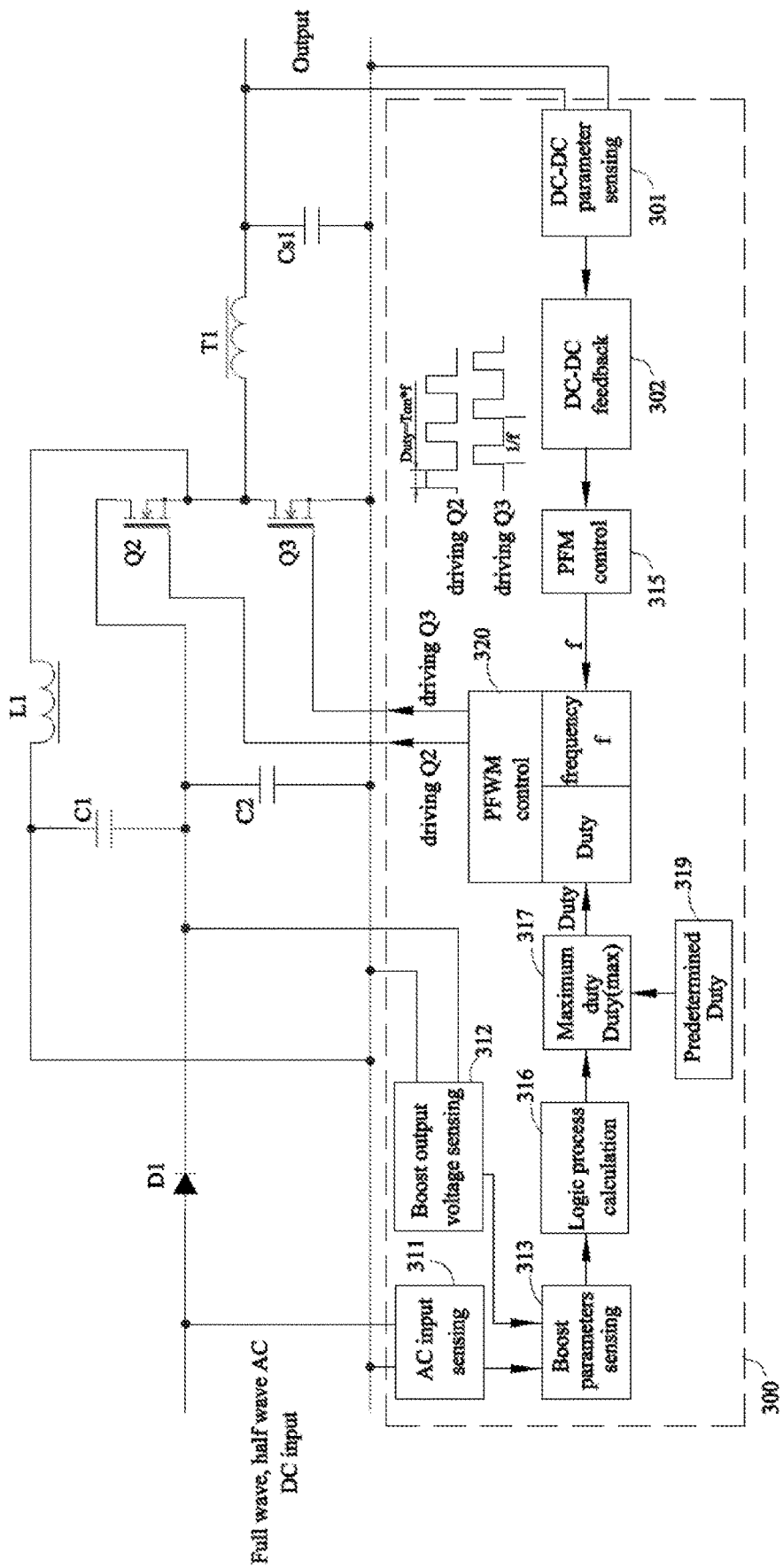
FIG. 14 is a schematics diagram about the first embodiment of the PFWM control for the combination power supply of boost and BUCK converters according to the present disclosure.

The first embodiment is shown in FIG. 14, wherein the switching power supply 1A adopts the PFWM method of the present disclosure. It is used to control the combination power supply of the boost and the BUCK converter.

The PFWM feedback control and the driving unit 300 operate in following processes: Sensing the DC-DC converter output parameter like the voltage, or the current or the power 301, comparing it to the setting value and according to the feedback 302 automatic control theory to obtain the frequency of PFM chopping signal 315. The BUCK DC-DC converter is controlled by the predetermined duty 319 which is also limited by the Duty(max) 317. Sensing boost converter parameters such as the input RMS voltage 311, the boost output voltage 312 and other boost parameters 313; by logical process and calculation 316, it comes out the Maximum duty 317 to prevent from the boost inductor L1 saturation, by which to limit the PFWM control unit 320's operating duty. The PFWM control could be realized by either hardware or software. Combining the obtained frequency of PFM and dynamically limited duty into at least a pair of complement PFWM driving signals, directly or after-modification to drive switching components Q2 and Q3.

Above combination of the boost and the BUCK converter comprises below two parts:

First part: Two input rectification circuits.

1) The first input rectification circuit includes a first rectification component D1, which rectifies the input voltage in the full wave mode, and the store energy in the storage capacitor C2; When the boost circuit operates after the power supply's turn-on, the boost output voltage on storage capacitor C2 is always higher than the instant voltage of the AC input, thus the AC input no longer charges the storage capacitor C2 directly; When the boost output power is insufficient to maintain the storage capacitor C2 voltage more than the instant AC voltage, the AC input starts charging the storage capacitor C2 again;

2) The second input rectification circuit includes a first input rectification component D1, a rectification circuit charges the boost capacitor C1; Due to the relatively small capacitance of the boost capacitor C1, the voltage on the boost capacitor C1 reflects the full wave rectification waveform of the input AC. In the active PFC (boost) circuit, the boost capacitor C1 purposes for the high frequency noise reduction and improvement of EMI.

Second part: The combination of the boost converter and the BUCK DC-DC converter.

BUCK circuit includes a storage capacitor C2, a first switching component Q2, a second switching component Q3, a main inductor T1 and a filter Cs1, working with feedback control and driving unit 300 to construct a BUCK DC-DC converter; On the other side, a first switching component Q2, a boost inductor L1, a boost capacitor C1, a second switching component Q3 and a storage capacitor C2, forms a boost converter.

Operating principle is described as below:

State 1: the first switching component Q2 turns on, the second switching component Q3 turns off.

When the first switching component Q2 conducts, the energy in the storage capacitor C2 flows in the main inductor T1, to deliver the power energy to load through the filter Cs1.

Simultaneously, the energy on the boost capacitor C1, through the first switching component Q2, flows into the first boost inductor L1, and the boost energy stored in the boost inductor L1.

State 2: the first switching component Q2 turns off, the second switching component Q3 keeps turn-off.

The energy stored in the inductor T1, through the output diode Ds1, the output filter Cs1 and the body diode of the second switching component Q3, release to the output load. The energy stored in the boost inductor L1, right at time of the first switching component Q2's cut-off, generates the induced voltage and accumulates with the voltage on the boost capacitor C1, through the body diode of the second switching component Q3, charges the storage capacitor C2.

State 3: the first switching component Q2 keeps turn-off, the second switching component Q3 turns on.

As the second switching component Q3 turns on, both the BUCK current and the boost current go through the second switching component Q3 instead of its body diode.

State 4: the first switching component Q2 keeps turn-off, the second switching component Q3 turns off.

As the second switching component Q3 turns off, both the BUCK current and the boost current go through the second switching component Q3's body diode if they still exist.

Thus both the BUCK converter and the boost converter complete 1 cycle energy transferring.

Above process repeats from state 1 to state 4.

The control method in the first embodiment, is to sense and send feedback DC-DC converter output parameter such as voltage or current or power 301, compare it to the setting value and according to the feedback automatic control theory (PID, zero-pole, etc.) 302 to obtain the frequency of the PFM chopping signal 315. Also, the input instant voltage 311 and the boost output voltage 312 are monitored. By logical process and the calculation 316, it comes out the Maximum duty 317 to limit the predetermined Duty 319 as the operating duty to prevent the boost inductor L1 from saturation, finally the PFWM control unit 320's operating duty is limited. Combining the frequency and the operating duty into the PFWM driving signal to drive the first switching component Q2 and the second switching component Q3, to fulfill the boost conversion from input to Vdc (voltage on C2) and then the DC-DC conversion from Vdc to output.

In the first embodiment, the PWFM control could correct the power factor while the input is a half wave or a full wave AC, it also can boost the DC input and further convert to the DC output.

In the case that the peak of the input voltage is less than a half of designed the boost output voltage, the boost inductor can reset fully without the Duty(max) operated.

Embodiment 2

Figure 15:
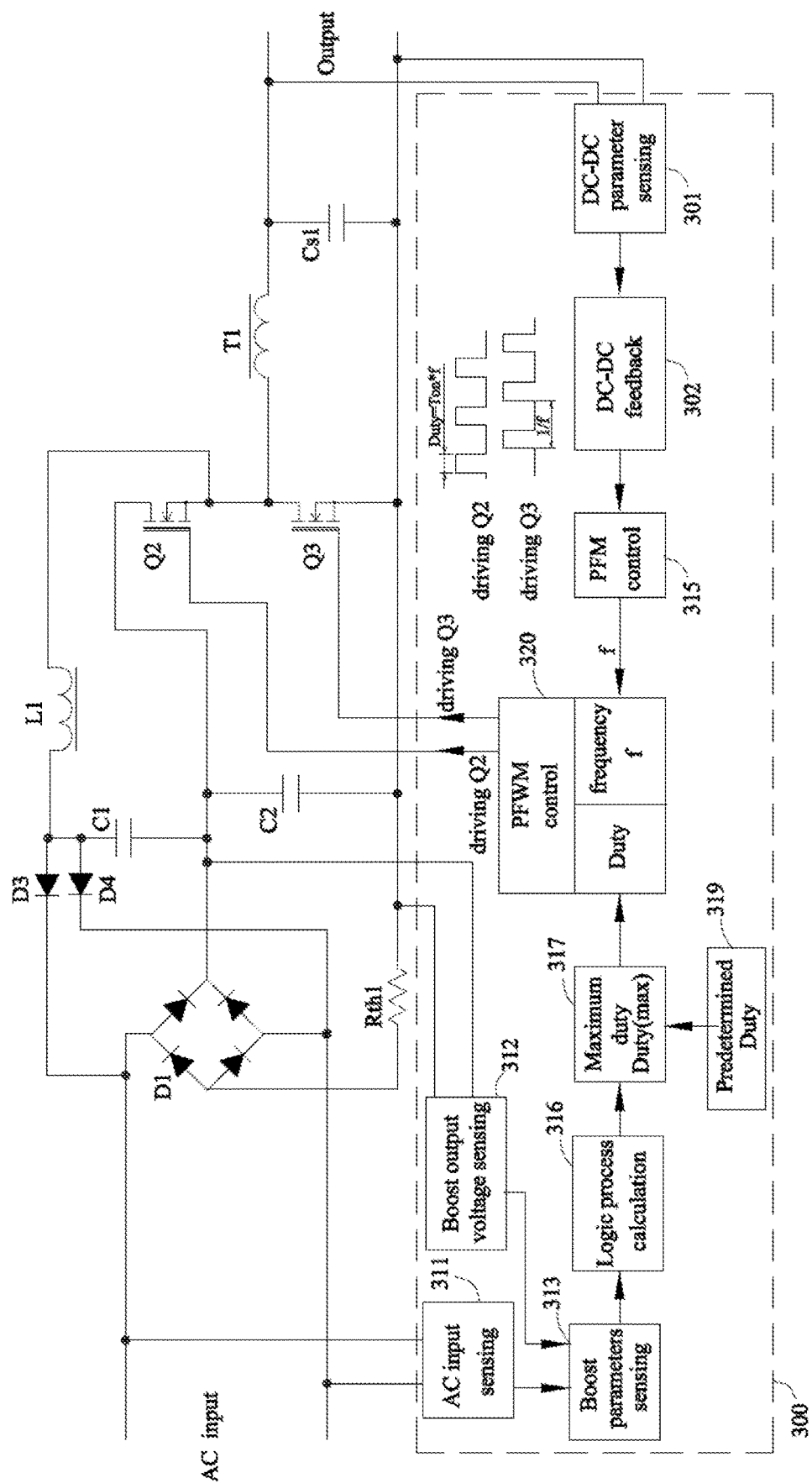
FIG. 15 is a schematics diagram about the second embodiment of the PFWM control for the combination power supply of boost and BUCK converters according to the present disclosure.

The second embodiment is shown in FIG. 15; the PFWM method is used to control the combination power supply of the boost and the BUCK converter. Its difference to the first embodiment is the PFWM controls the power supply with the AC input.

Sense the input instant voltage 311 and the boost output voltage 312. On the condition of Vin more than Vdc/2, based on the logical process and the calculation unit 316, calculate the Maximum duty 317 to limit the predetermined duty 319 to prevent from the boost inductor L1 saturation.

Figure 16:
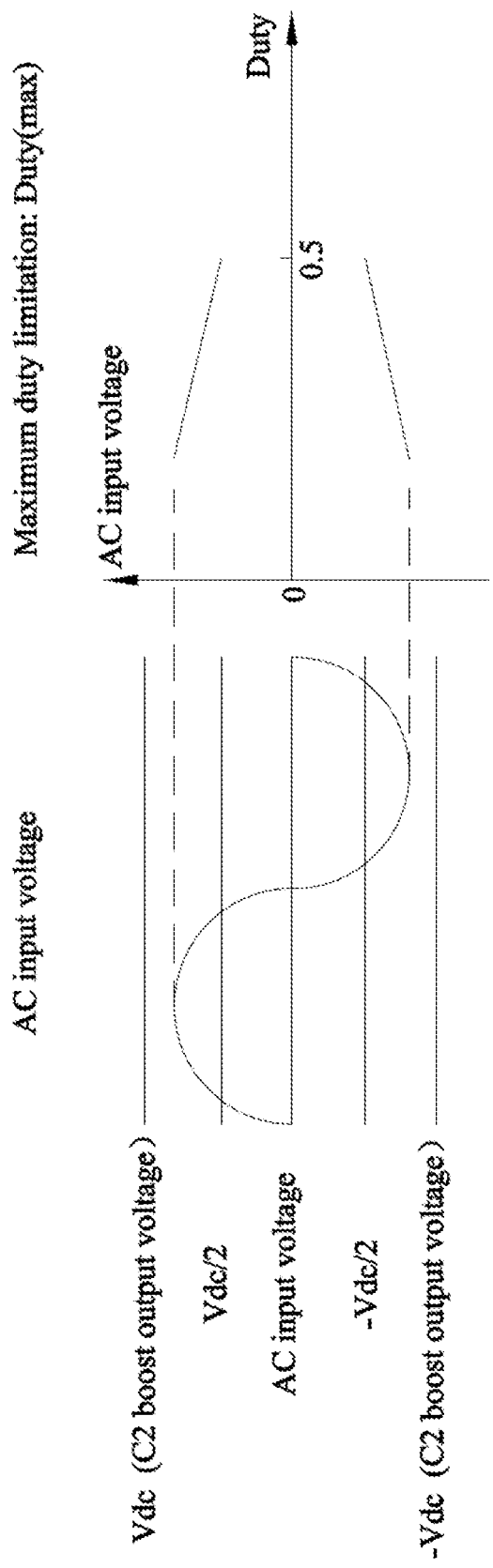
FIG. 16 is a diagram show example of the Duty(max) limit according to the instant input voltage and Vdc according to the present disclosure.

The example of the maximum duty relating to the AC input voltage (Vin) and the boost output voltage (Vdc) is illustrated in FIG. 16. When Vin is higher than Vdc/2, the maximum duty limit is applied.

The second embodiment is suitable for the boost and the BUCK DC-DC combination with the AC input.

Embodiment 3

Figure 17:
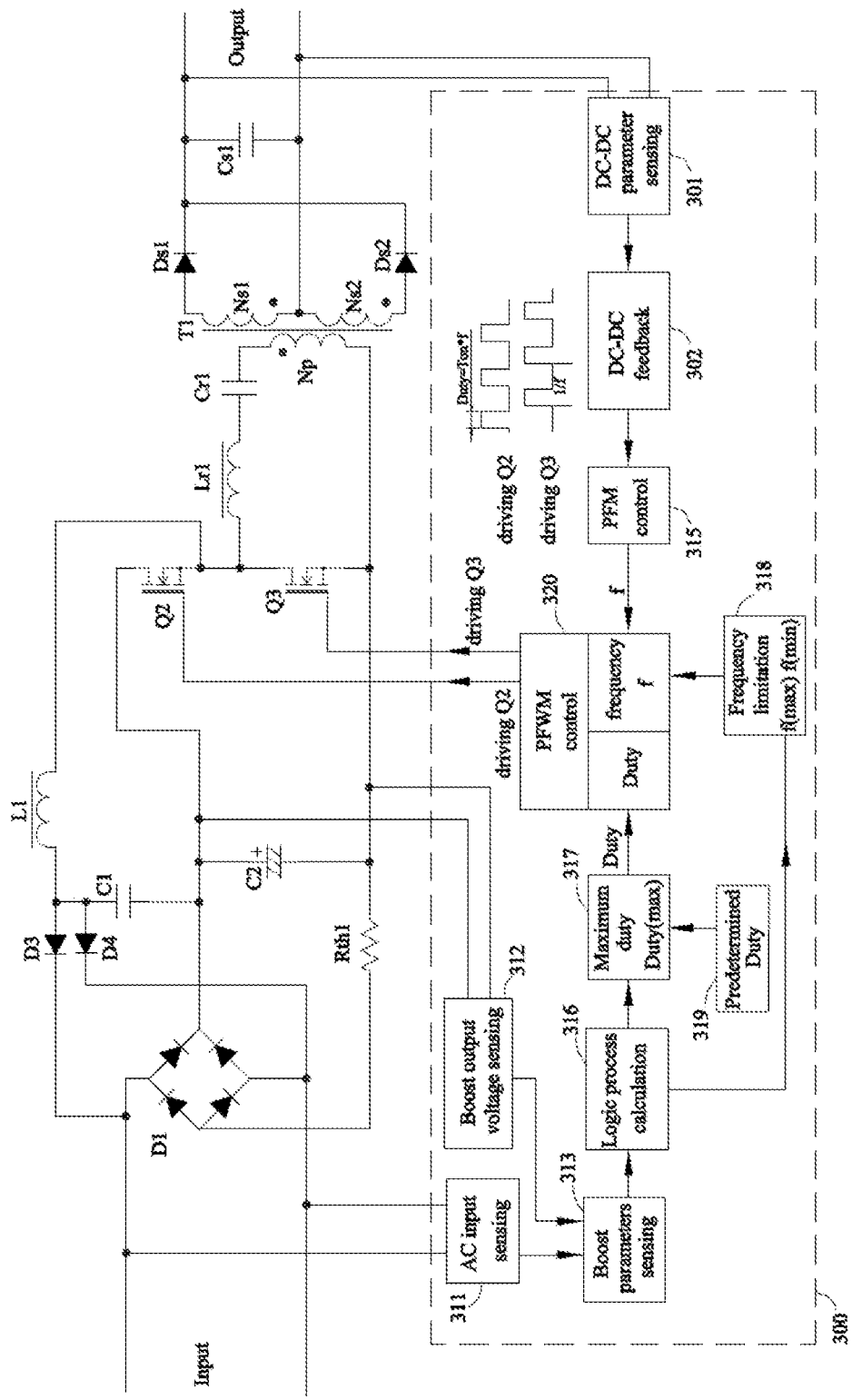
FIG. 17 is a schematics diagram about the third embodiment of the PFWM control for the combination power supply of boost and half bridge converters according to the present disclosure according to the present disclosure.

The third embodiment, as shown in FIG. 17, is also to utilize the PFWM method to control both boost and asymmetrical half bridge converters. Its difference to the second embodiment is: By using the logic process calculation unit 316 to obtain the maximum operating frequency f(max) and the minimum operating frequency f(min)318 based on the boost parameters sensing 313 such as the input voltage 311 and the boost output 312. Use f(max) and f(min) to limit the PFWM control unit 320, so as to ensure the DCM of the boost inductor L1 and the proper ZVS operation of the first switching component Q2 and the second switching component Q3.

The control method of the embodiment 3 accomplishes the control of the boost output and the DC-DC output by taking advantage of the PFWM driving signal. It uses the variable duty limitation Duty(max) to ensure the boost inductor magnetic reset. Additionally, by dynamically setting f(max) and f(min), it achieves discontinuous mode operation and soft switching of the first switching component Q2 and the second switching component Q3.

To summarize based on above, the present disclosure discloses a kind of PFWM control method suitable for a combination power supply of boost and bridge type DC-DC converters. The bridge type DC-DC converter includes BUCK, a half bridge and a full bridge in which there is at least a bridge arm containing low side and high side switching components. The PFWM uses the frequency to adjust the boost output so as to adjust the DC-DC output. It also uses the variable duty limitation Duty(max) to ensure the boost inductor magnetic reset. Additionally, by dynamically setting f(max), f(min) and controlling dead time of low side and high side switching components, it achieves the discontinuous mode operation and the soft switching of the first switching component Q2 and the second switching component Q3.

Although the contents of the present disclosure have been described in detail through the foregoing preferred embodiments, it should be understood that the depictions above shall not be regarded as limitations to the present disclosure. After those skilled in the art having read the contents above, many modifications and substitutions to the present disclosure are all obvious. Therefore, the protection scope of the present disclosure should be limited by the appended claims.

We claim:

1. A Pulse Frequency and Width Modulation (PFWM) control method for a combination power supply of a boost converter and a bridge type DC-DC converter, which also includes BUCK, the control method comprising:

sensing the DC-DC converter's output voltage, current or power, to obtain a frequency of a Pulse Frequency Modulation (PFM) chopping signal for driving switching components according to an automatic feedback and control theory;

sensing an instant input voltage and a boost output voltage, to obtain a maximum duty to prevent a boost inductor from saturation caused by an insufficient magnetic reset;

predetermining an operating duty which is limited by the obtained maximum duty;

combining the obtained PFM frequency and the operating duty into at least a pair of complementary PFWM driving signals, directly, indirectly or after modification to drive at least a first switching component and a second switching component of the bridge type DC-DC converter, adjusting an output of the boost converter so as to control a DC-DC output.

2. The PFWM control method according to claim 1, further comprising a dead time control between complement PFWM driving signals, to drive switching components of the boost converter and the bridge type DC-DC converter.

3. The PFWM control method according to claim 2, further comprising a zero current detection of the boost inductor, upon which controls an elapse interval between the boost inductor's current returning to zero and next on-to-off operation of the second switching component.

4. The PFWM control method according to claim 1, further comprising setting a maximum frequency of the PFWM according to a value or a range of the sensed instant input voltage.

5. The PFWM control method according to claim 1, further comprising setting a minimum frequency of the PFWM according to a value or a range of the sensed instant input voltage.

6. The PFWM control method according to claim 1, wherein several pairs of PFWM signals are obtained to drive several combination power supplies.

7. The PFWM control method according to claim 1, wherein several pairs of PFWM channels are obtained to drive several channels of combination power supplies in a manner of interleaving, phase shift, or synchronization.

* * * * *